United States Patent
Havens et al.

(10) Patent No.: US 8,038,066 B2
(45) Date of Patent: Oct. 18, 2011

(54) LASER SCANNER WITH DEFORMABLE LENS

(75) Inventors: William H. Havens, Syracuse, NY (US); Ynjiun P. Wang, Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 335 days.

(21) Appl. No.: 12/432,517

(22) Filed: Apr. 29, 2009

(65) Prior Publication Data
US 2010/0276493 A1    Nov. 4, 2010

(51) Int. Cl.
*G06K 7/10* (2006.01)

(52) U.S. Cl. ............. 235/470; 235/462.15; 235/462.23

(58) Field of Classification Search ............ 235/462.23, 235/462.15, 470
See application file for complete search history.

(56) References Cited

U.S. PATENT DOCUMENTS

| | | | |
|---|---|---|---|
| 5,945,670 A | 8/1999 | Rudeen |
| 6,024,283 A | 2/2000 | Campanelli et al. |
| 6,062,476 A | 5/2000 | Stern et al. |
| 6,188,526 B1 | 2/2001 | Sasaya et al. |
| 6,246,528 B1 | 6/2001 | Schachar |
| 6,288,846 B1 | 9/2001 | Stoner, Jr. |
| 6,344,930 B1 | 2/2002 | Kaneko et al. |
| 6,543,693 B1 | 4/2003 | Stern et al. |
| 6,618,208 B1 | 9/2003 | Silver |
| 6,658,208 B2 | 12/2003 | Watanabe et al. |
| 6,935,743 B2 | 8/2005 | Shadduck |
| 7,025,468 B2 | 4/2006 | Nishioka et al. |
| 7,068,439 B2 | 6/2006 | Esch et al. |
| 7,077,322 B2 | 7/2006 | Miyazawa et al. |
| 7,128,270 B2 | 10/2006 | Silverbrook et al. |
| 7,201,318 B2 | 4/2007 | Craen et al. |
| 7,243,849 B2 | 7/2007 | Lapstun et al. |
| 7,264,162 B2 | 9/2007 | Barkan |
| 7,296,749 B2 | 11/2007 | Massieu |
| 7,352,434 B2 | 4/2008 | Streefkerk et al. |
| 7,369,723 B1 | 5/2008 | Mescher |
| 7,416,125 B2 | 8/2008 | Wang et al. |
| 7,450,273 B2 | 11/2008 | Silverbrook et al. |
| 2005/0200973 A1 | 9/2005 | Kogo et al. |

(Continued)

FOREIGN PATENT DOCUMENTS

EP         1450291         8/2004

(Continued)

OTHER PUBLICATIONS

Varioptic'S Liquid Auto-Focus Lens Wins 1st Prize in 2006 Dupont Plunkett Awards for Innovation With Teflon® (4 pp).
Nelson, Lee: Liquid Lens—Technology, Photonics, Vision systems design, Advanced imaging URL: http://articles.directorym.net/LIQUID_LENS-a906589.html (5 pp).

(Continued)

*Primary Examiner* — Allyson Trail
(74) *Attorney, Agent, or Firm* — Heslin Rothenberg Farley & Mesiti P.C.

(57) ABSTRACT

A scanning apparatus comprises a laser source adapted to emit a beam along an axis and illuminate a target, a detector adapted to receive light of varying intensities scattered from the target and convert the light into a signal, and a controller operatively associated with the detector for receiving the signal from the detector and decoding the signal. A focusing apparatus comprising a deformable lens element in optical communication with the laser source has a deformable surface, at least part of which transmits the beam. The deformable lens element defines an index of refraction difference with an index of refraction of an adjacently disposed substance. In one embodiment the index of refraction difference is greater than 0.30.

21 Claims, 7 Drawing Sheets

U.S. PATENT DOCUMENTS

| | | | |
|---|---|---|---|
| 2007/0030573 | A1 | 2/2007 | Batchko et al. |
| 2007/0063048 | A1 | 3/2007 | Havens et al. |
| 2007/0080280 | A1 | 4/2007 | Havens |
| 2007/0097528 | A1 | 5/2007 | Hagiwara et al. |
| 2007/0211207 | A1 | 9/2007 | Lo et al. |
| 2008/0019015 | A1 | 1/2008 | Fernandez et al. |
| 2008/0144185 | A1 | 6/2008 | Wang et al. |
| 2008/0144186 | A1 | 6/2008 | Feng et al. |
| 2008/0204905 | A1 | 8/2008 | Mizuno et al. |
| 2008/0218873 | A1 | 9/2008 | Batchko et al. |
| 2008/0231963 | A1 | 9/2008 | Batchko et al. |
| 2008/0245872 | A1 | 10/2008 | Good |
| 2008/0259463 | A1 | 10/2008 | Shepherd |
| 2008/0277477 | A1* | 11/2008 | Thuries et al. ............ 235/462.23 |
| 2008/0277480 | A1 | 11/2008 | Thuries et al. |
| 2009/0072037 | A1 | 3/2009 | Good et al. |
| 2009/0097140 | A1 | 4/2009 | Choi et al. |
| 2010/0276490 | A1* | 11/2010 | Havens et al. ............ 235/462.32 |

FOREIGN PATENT DOCUMENTS

| | | |
|---|---|---|
| JP | 2002162506 | 6/2002 |
| WO | WO-9415351 | 7/1994 |
| WO | WO-2005073895 | 8/2005 |
| WO | WO-2008076399 | 6/2008 |
| WO | WO-2008076399 A2 | 6/2008 |
| WO | WO-2008124235 | 10/2008 |

OTHER PUBLICATIONS

Hayes, Tim: Fluidic lenses move from laboratory to factory URL: http://optics.org/cws/article/industry/30803 Aug. 10, 1997 (2 pp).

U.S. Appl. No. 12/432,434, filed: Apr. 29, 2009, Inventors: William H. Havens, Chen Feng, Ynjiun P. Wang.

U.S. Appl. No. 12/432,517, filed: Apr. 29, 2009, Inventors: William H. Havens, Ynjiun P. Wang.

U.S. Appl. No. 12/432,534, filed: Apr. 29, 2009, Inventors: William H. Havens, Timothy P. Meier, Ynjiun P. Wang.

U.S. Appl. No. 12/540,075, filed: Aug. 12, 2009, Inventors: William H. Havens, Timothy P. Meier.

European Patent Office, Partial European Search Report, dated Jan. 28, 2011, European Patent Application No. 10161221.6 (4 pages).

European Patent Office, Notification of European Publication Number, dated Oct. 6, 2010, European Patent Application No. 10161221.6, (1 page).

European Patent Office, European Patent Application Number: 10161088.9, Communication Pursuant to Article 94(3), dated Feb. 15, 2011 (5 pages).

European Patent Office, European Patent Application Number: 10161221.6, Communication Pursuant to Article 94(3), dated Mar. 1, 2011 (5 pages).

* cited by examiner

FIG. 1

PRIOR ART

LASER SCANNER WITH DEFORMABLE LENS

FIELD OF THE INVENTION

This invention relates generally to the field of optical scanning systems for reading indicia, and more particularly to a variable focus distance lens assembly for increasing the working range of an optical scanning system.

BACKGROUND OF THE INVENTION

Various optical scanning apparatuses have been developed to read and decode optical indicia, such as bar code symbols on a target such as a label. While early bar code scanners were designed to read symbols at a relatively close distance, there exists a need to read symbols at greater and greater distances, for example in warehousing environments. Conventional optical scanning systems, such as hand-held bar code laser scanners, typically have a limited working range due to the constraints imposed on the optical assembly. Motorized systems with additional lenses or mirrors have been developed to reposition the fixed lens assembly along the optical path, thereby moving the laser beam waist and increasing the working range of the scanning apparatus. However, such improvements are complicated and add cost.

For example, U.S. Pat. No. 4,916,318 discloses a polygon mirror mounted to a rotating shaft that deflects a laser beam emitted from a laser source to the target to be scanned. In the scanning apparatus there is a fixed projecting lens disposed between the laser source and the polygon mirror. An optical member, such as a plane parallel plate, is moved in and out of the beam of the laser source to change the beam waist of the laser beam. Several drawbacks to this system exist. The mechanical components required to move the plane parallel plate in and out of the beam are complex, having many moving parts connected by pulleys, belts and the like. Another drawback is that the working range is limited to the thickness of the plane parallel plate. Also, the system is not compact, and is therefore ill-suited for use in a hand-held apparatus.

In another example, U.S. Pat. No. 5,302,812 discloses a scanning apparatus that varies the range of a laser beam waist by moving the fixed convex lens assembly. The fixed lens is moved longitudinally along the optical axis by activation of magnetic coil. The scanning apparatus includes a lens support member supported on a pair of leaf springs so that it can oscillate longitudinally along the optical axis. Permanent magnets are also supported by the leaf springs. Movement of the fixed lens is achieved by varying the strength of the field generated by the magnetic coil. Like the scanning apparatus disclosed in U.S. Pat. No. 4,916,318, this system is complex and adds cost to the scanning apparatus.

SUMMARY OF THE INVENTION

In view of the background, it is therefore an object of the present invention to provide a scanning apparatus that includes a laser source, a focusing apparatus having a deformable lens element, and an actuator.

It is another object of the present invention to provide a scanning apparatus with an extended range of focus lengths, thereby allowing a user of the apparatus to decipher symbol characters such as bar codes at a greater range of distances than previous scanning apparatuses.

It is a further object of the invention to provide a focusing apparatus adapted to vary a focus distance between a minimum focus distance and a maximum focus distance. According to an embodiment of the invention, the distance between the minimum focus distance and the maximum focus distance is greater than thirty feet.

According to an embodiment of the invention, the actuator is adapted to impart a force to the deformable lens element, the force being in a direction substantially parallel with the axis of a laser beam emitted from the laser source.

According to another embodiment of the invention, a deformable surface of the deformable lens element is configured to deform in a direction opposite the direction of the imparted force.

It is a further object of the invention to provide a focusing apparatus having a deformable lens element defining an index of refraction difference with an index of refraction of an adjacently disposed substance, wherein the index of refraction difference is greater than 0.30.

BRIEF DESCRIPTION OF THE DRAWINGS

The novel features that are characteristic of the preferred embodiment of the invention are set forth with particularity in the claims. The invention itself may be best be understood, with respect to its organization and method of operation, with reference to the following description taken in connection with the accompanying drawings in which:

DETAILED DESCRIPTION OF THE PREFERRED EMBODIMENT

Lens assemblies that vary the focus distance of the lens have been developed to extend the working range of a scanning apparatus. One such example is an electro-wetting lens assembly, wherein the curvature of the lens is varied depending on an applied voltage. Although an electro-wetting lens can be useful and may be advantageous for certain applications, it suffers from drawbacks.

Figure 1:
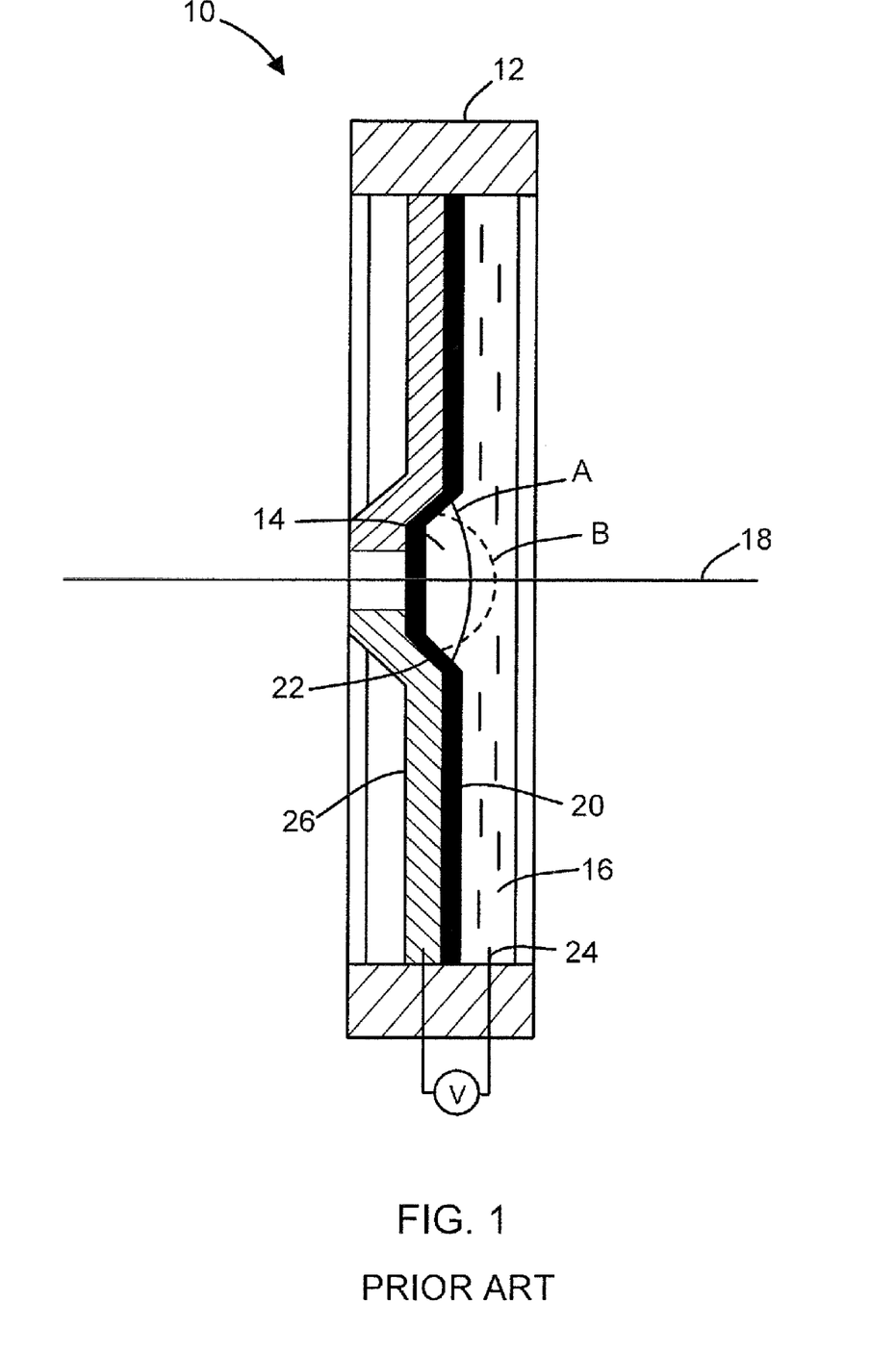
FIG. 1 is a schematic diagram showing in cross section a variable lens element of the prior art.

One such problem noted with the design of electro-wetting lens is that the difference in the indices of refraction at the lens interface makes the system susceptible to aberrations, for example spherical aberrations. Referring to FIG. 1 of the drawings, a prior art electro-wetting focusing apparatus 10 is shown including a housing 12 in which a first fluid 14, shown in liquid droplet form, and a second fluid 16 are arranged along an optical axis 18. The fluids 14, 16 are light-transmissive, immiscible, of different optical indices of refraction and of substantially the same density. The first fluid of drop 14 is constituted of an electrically insulating substance. In the prior art example, the first fluid 14 is oil having an index of refraction of about 1.45. The second fluid 16 is constituted of an electrically conductive substance, namely water loaded with salts and having an index of refraction of about 1.35. The housing 12 includes a dielectric wall 20, preferably having a well 22 in which the drop 14 is accommodated in symmetrical relation relative to the axis 18. The wall 20 normally has a low wetting characteristic compared to the drop 14, but a surface treatment insures a high wetting characteristic and maintains a centered position of the drop 14 and prevents the drop from spreading. The well 22 further helps to prevent such spreading.

A first electrode 24 extends into the second fluid 16, and a second electrode 26 is located below the wall 20. The electrodes are connected to a voltage source V. The electrodes, especially electrode 26, are preferably light-transmissive. When a voltage is applied across the electrodes, an electrical field is created which alters the wetting characteristic of the wall 20 with respect to the drop 14. The wetting increases substantially in the presence of an electrical field. With no voltage applied, the drop 14 takes the generally hemispherical shape shown in solid lines in FIG. 1, and its outer surface "A" is convex. When a voltage is applied, the wetting of the dielectric wall 20 increases, and the drop 14 deforms and takes the shape shown in dashed lines in FIG. 1, and its outer surface "B" is more convex with a smaller radius of curvature. This deformation of the drop deforms the lens surface defined by the two fluids 14 and 16, thereby changing the focus distance of the electro-wetting focusing apparatus 10.

The difference in indices of refraction of the two fluids 14, 16 at the lens surface influences the paraxial focal length f according to the formula $$\frac{1}{f} \cong \frac{n_{fluid14} - n_{fluid16}}{1}\left(\frac{1}{R}\right) \quad (1)$$

(for an electro-wetting lens in air with infinitely thin boundary between the fluids and air), where $n_{fluid14}$ is the index of refraction for the first fluid 14, $n_{fluid16}$ is the index of refraction for the second fluid 16, and R is the radius of curvature of the lens. As stated above, in one example the index of refraction for the first fluid 14 is about 1.45, the index of refraction for the second fluid 16 is about 1.35, and the radius of the lens is 10.08 millimeters. The resulting focal length is 100.8 millimeters.

The focal length of the electro-wetting focusing apparatus 10 is changed by modifying the radius of curvature at the boundary between the first fluid 14 and the second fluid 16. One problem noted with the electro-wetting lens configuration is that the longitudinal spherical aberration is relatively large for a desired focal length as compared to an equal focal length using a simple plano-convex optical system in air. This is so because the difference in index of refraction over the variable boundary (e.g., A or B in FIG. 1) is small, approximately 0.1, and a smaller radius of curvature is required to effect a desired focal length than would be required if the index of refraction difference were larger, for example if one of the materials were air (n=1.00). Because the radius of curvature is smaller, it can be further shown that the spherical aberration will be larger. In one example, an electro-wetting focusing apparatus 10 with a focal length of approximately 100 millimeters, a lens radius of 10.08 millimeters, and a beam radius of 1 millimeter has a calculated longitudinal spherical aberration of approximately 0.58 millimeters. In this example, the longitudinal spherical aberration is calculated as the difference between the ray crossing distances for a marginal ray height of 0.0 and 1.0 millimeters. In contrast, a simple plano-convex optical system having the first fluid being air with an index of refraction of 1.0, the same focal length (100 millimeters), the same index of refraction for the second fluid (1.45), and a lens radius of 45 millimeters, has a calculated longitudinal spherical aberration of approximately 0.05 millimeters. As can be seen in this example, the electro-wetting focusing apparatus 10 generates longitudinal spherical aberrations approximately one order of magnitude greater than a simple plano-convex optical system.

In the electro-wetting lens example, as voltage is applied the radius of curvature R decreases, and in accordance with the above formula the focal length decreases. As the radius of curvature becomes smaller to extend the range of focus distances, optical aberrations become more pronounced. The aberrations must be corrected by additional lens elements, software corrections, or both. In some instances, the aberrations may not be correctable.

The inventors of the present invention have determined that the problems associated with optical aberrations arising from a small radius of curvature may be mitigated by selecting lens materials and surrounding components with indices of refraction that are of sufficient difference so as require far less deformation of the deformable lens element to achieve a proportional range of focus variation. This realization prompted the inventors to devise a novel structure for a scanning apparatus that captures the advantages of less aberration while also providing fast response, low input power, a greater range of focus variation, and a simpler construction.

Figure 2:
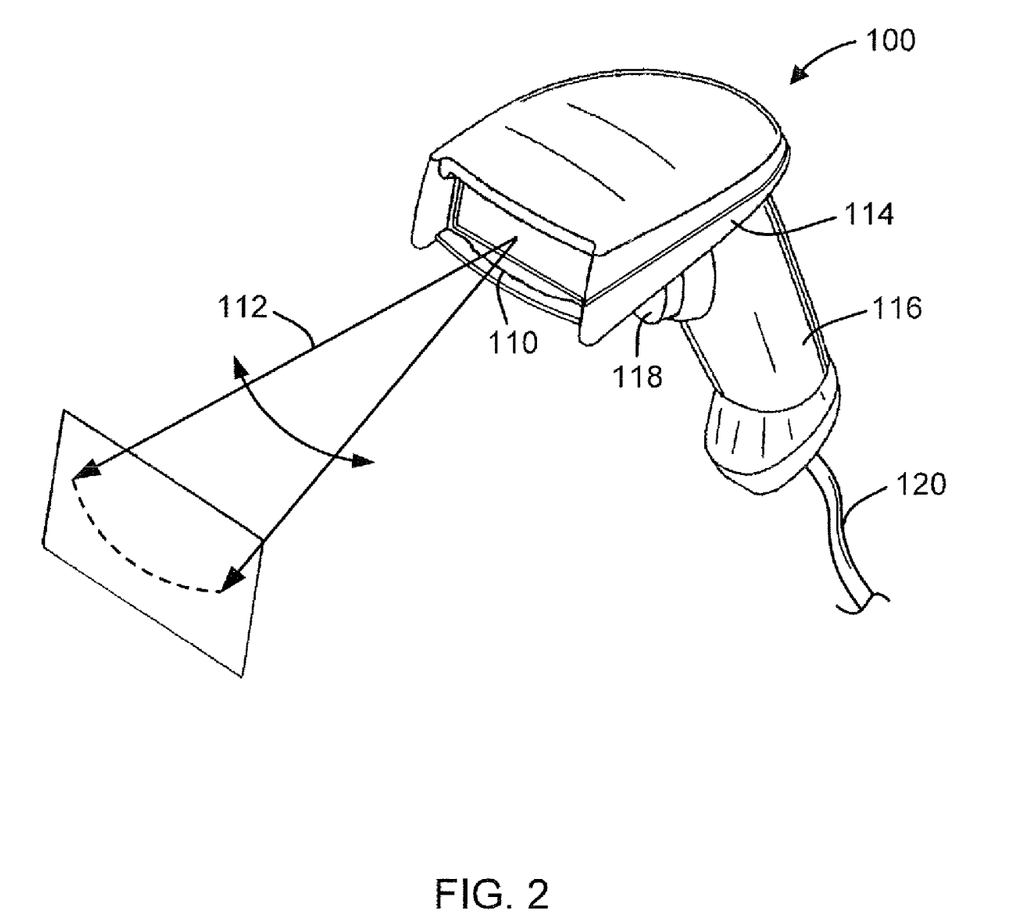
FIG. 2 is a perspective exterior view of a scanning apparatus according to an embodiment of the invention.

A possible construction is as follows. Referring to FIG. 2 of the drawings, a perspective view of a scanning apparatus 100 is shown for use in accordance with the present invention. The scanning apparatus 100 in the illustrated example is a hand-held reader including an electro-optical system for reading encoded symbol characters of a symbology, for example bar codes.

As used herein, "encoded symbol character" is intended to denote a representation of a unit of information in a message, such as the representation in a bar code symbology of a single alphanumeric character. One or more encoded symbol characters can be used to convey information, such as the identification of the source and the model of a product, for example in a UPC bar code that comprises twelve encoded symbol characters representing numerical digits. Also, an encoded symbol character may be a non-alphanumeric character that has an agreed upon conventional meaning, such as the elements comprising bars and spaces that are used to denote the start, the end, and the center of a UPC bar code. The bars and spaces used to encode a character as an encoded symbol are referred to generally as "elements." For example, an encoded character in a UPC symbol consists of four elements, two bars, and two spaces. Similarly, encoded symbol characters can be defined for other bar code symbologies, such as other one-dimensional ("1-D") bar code systems including Code 39 and Code 128, or for stacked two-dimensional ("2-D") bar code systems including PDF417.

The scanning apparatus 100 includes a variable focus distance lens assembly 110 for focusing a laser beam 112, as will be described in detail below. The scanning apparatus 100 further includes a housing 114 which, in one example, may have a pistol grip handle 116 and a trigger 118. Pressing the trigger 118 activates the laser beam 112 and allows the variable focus distance lens assembly 110 to focus a beam on the symbol character. The scanning apparatus 100 may further include a data cable 120 to transfer data from the scanning apparatus to a host computer (not shown).

Figure 3:
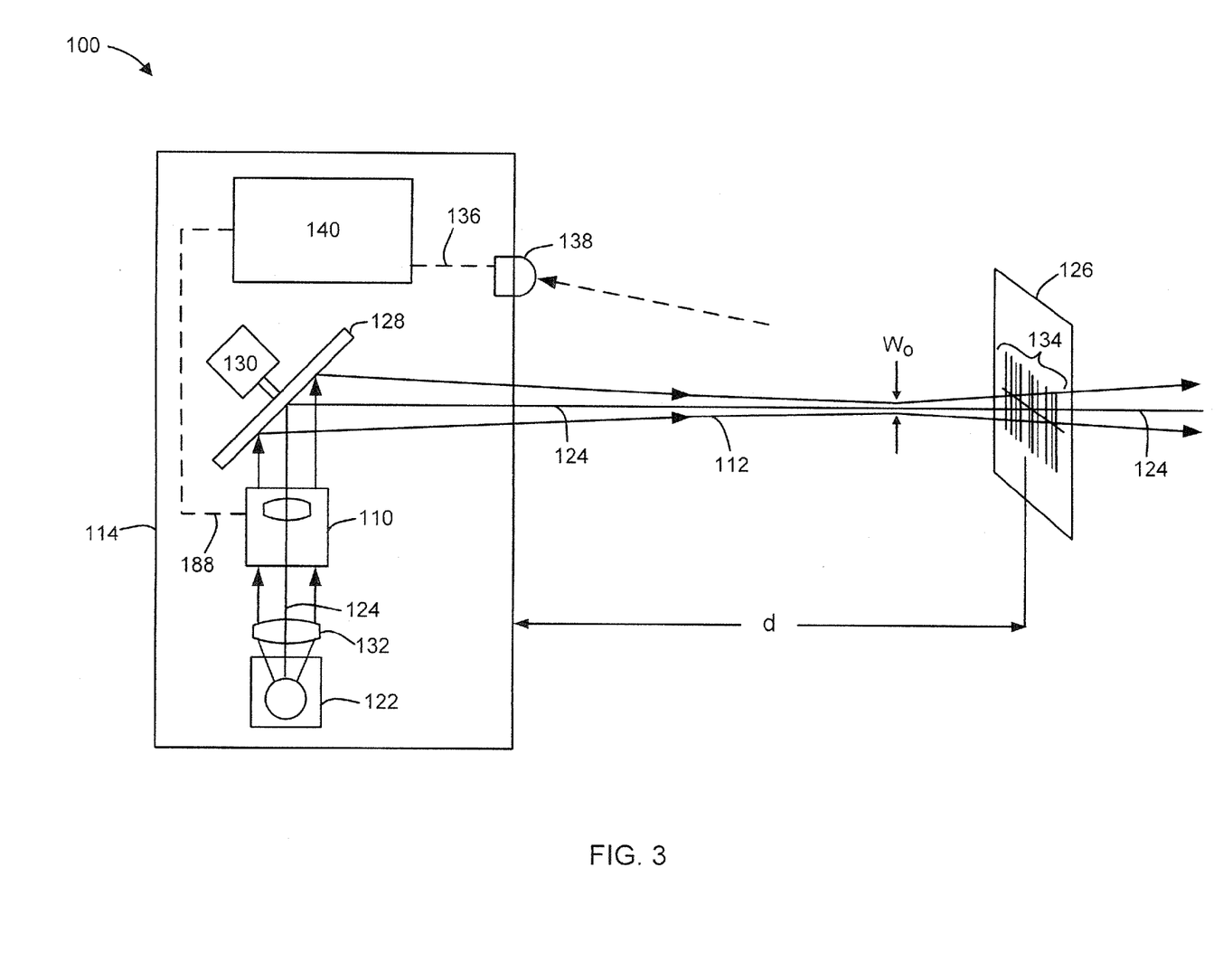
FIG. 3 is a schematic diagram showing in cross section the scanning apparatus shown in FIG. 2.

Referring to FIG. 3 of the drawings, a schematic view of the scanning apparatus 100 is shown. The scanning apparatus 100 includes a laser source 122 mounted securely to the housing 114 and aligned so as to emit the laser beam 112 along an optical path, or axis 124, to illuminate a target 126. The laser source 122 may be a laser diode, for example. The scanning apparatus 100 further includes a scanning mirror 128 disposed within the optical path. In the disclosed embodiment, the scanning mirror 128 is positioned within the housing 114 after the variable focus distance lens assembly 110. The scanning mirror 128 reflects the emitted beam 112 incident thereon and directs it towards the target 126. Further, the scanning mirror 128 oscillates at a pre-determined frequency to sweep the beam 112 over the target 126 according to a pre-described scan pattern. The scan pattern may be along a line transverse to the plane of the target, e.g. a side-to-side motion. In some instances, an orthogonal scanning mechanism is added to allow raster scanning. The oscillation motion of the scanning mirror 128 may be driven by a motor 130.

A collimating lens 132 may be disposed along the axis 124 between the laser source 122 and the variable focus distance lens assembly 110 to produce near parallel beams of light. In the disclosed example, the collimating lens 132 is disposed between the laser source 122 and the scanning mirror 128, but the lens 132 may be placed at any advantageous location along the axis 124. In one embodiment, the collimating lens 132 is included as part of the assembly of the laser source 122. The collimating lens 132 is chosen by the manufacturer of the scanning apparatus 100 according to the particular requirements of the design.

The laser beam 112 passes through the variable focus distance lens assembly 110 striking the target 126 at an object distance d. The laser beam waist, denoted by $W_0$, indicates the location of the minimum beam diameter. The waist $W_0$ is positioned preferably near the object distance d in order for the scanning apparatus 100 to properly decode the symbol pattern.

In the illustrated example the target 126 includes a plurality of encoded symbol characters 134, which in one example is a 1-D bar code. Laser light illuminating the symbol characters 134 is scattered from areas of light and dark bands. The scanning apparatus 100 can generate an electrical signal 136 representing the reflectance pattern of the bar code for each scan. In the disclosed embodiment, a detector 138, such as a photodiode, is secured to the scanning apparatus 100 and detects the scattered light of varying intensity and converts it to the electrical signal 136. The electrical signal 136, after appropriate amplification and digitization, is passed to a controller 140 to be decoded. The controller 140 can process the electrical signal 136 to identify patterns of light and dark cells, and can determine symbol characters 134 or character strings corresponding to identical patterns by comparing them to pre-stored information, such as information stored in a lookup table.

In one example, the scanning apparatus 100 operates in an open-loop cycle, meaning the controller receives no feedback as to where the beam waist is relative to the target 126. When the scanning apparatus 100 is activated, such as when an operator depresses the trigger 118, the scanning apparatus 100 captures a first signal with the variable focus distance lens assembly set to a first focus distance. If the signal cannot be decoded, the controller 140 may command the variable focus distance lens assembly 110 to change the focus distance of the beam 112 and capture a second signal with the lens assembly set to a second focus distance. If the signal still cannot be decoded, the controller 140 may automatically command the variable focus distance lens assembly 110 to sequentially change the focus distance of the beam 112 until a successful decode is achieved. Of course, it is possible that the controller 140 is able to properly decode the signal after the first signal 136 is received. In this event, the controller utilizes only the first signal for attempting to decode the target 126.

In another example, the scanning apparatus is operative so that the variable focus distance lens assembly 110 switches between the first focus distance and the second focus distance responsive to a command or set of commands input by an operator. For example, the operator may depress the trigger 118 and the controller 140 attempts to decode the first signal captured. If unsuccessful, the operator may manually adjust the distance to the target 126, such as by moving the scanning apparatus 100 closer, and depress the trigger 118 a second time to capture a second signal. The controller 140 attempts to decode the second signal and, if unsuccessful, the process may be repeated until a successful decode is achieved.

Figure 4:
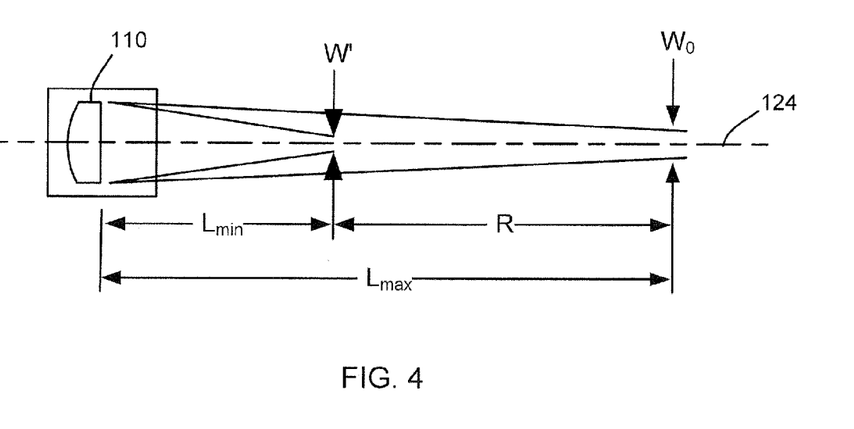
FIG. 4 is a schematic diagram for explaining one aspect of the variable focus distance lens assembly shown in FIG. 3.

The variable focus distance lens assembly 110 of the present invention is adapted to vary the focus distance of the beam 112 by changing an optical characteristic of the deformable lens element, such as the radius of curvature of the deformable surface of the lens. Referring to FIG. 4 of the drawings, the lens assembly 110 is schematically shown as having a minimum and maximum plane of nominal focus, or focus distance, designated by $L_{min}$ and $L_{max}$ respectively, which also corresponds to the position of the beam waist along the optical axis 124. The working range of the lens assembly 110, that is, the difference between the minimum and maximum focus distance, is denoted by R.

Figure 5A:
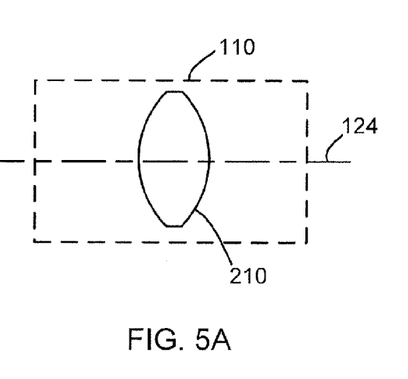
FIG. 5A is a schematic diagram showing in cross section lens elements in accordance with FIG. 3.
Figure 5B:
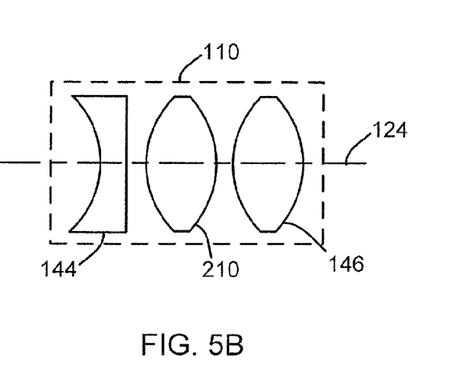
FIG. 5B is a schematic diagram showing in cross section lens elements in accordance with FIG. 3.

As mentioned above, the scanning apparatus 100 includes the variable focus distance lens assembly 110 for focusing a beam on the target 126. As shown in FIG. 5A of the drawings, the variable focus distance lens assembly 110 includes at least one focusing apparatus 210. As shown in FIG. 5B, the variable focus distance lens assembly 110 may further include a plano-concave lens 144, a correcting biconvex lens 146, or other lens elements to suit the particular needs of the scanning apparatus 100, such as lens elements to correct spherical aberration. In some examples, the variable focus distance lens assembly 110 may include a plurality of focusing apparatuses 210. In general, the focusing apparatus 210 may include a deformable surface in optical communication with the beam 112. The deformable surface can act as a focusing lens, wherein an actuator 148 (FIG. 6) acts upon the deformable surface to vary the curvature of the lens, thereby varying the focal length. In this manner, the object distance of the scanning apparatus 100 may be varied without resorting to moving a fixed lens along the axis 124. As referred to herein, object distance means the distance from the housing 114 to the target 126.

Figure 6:
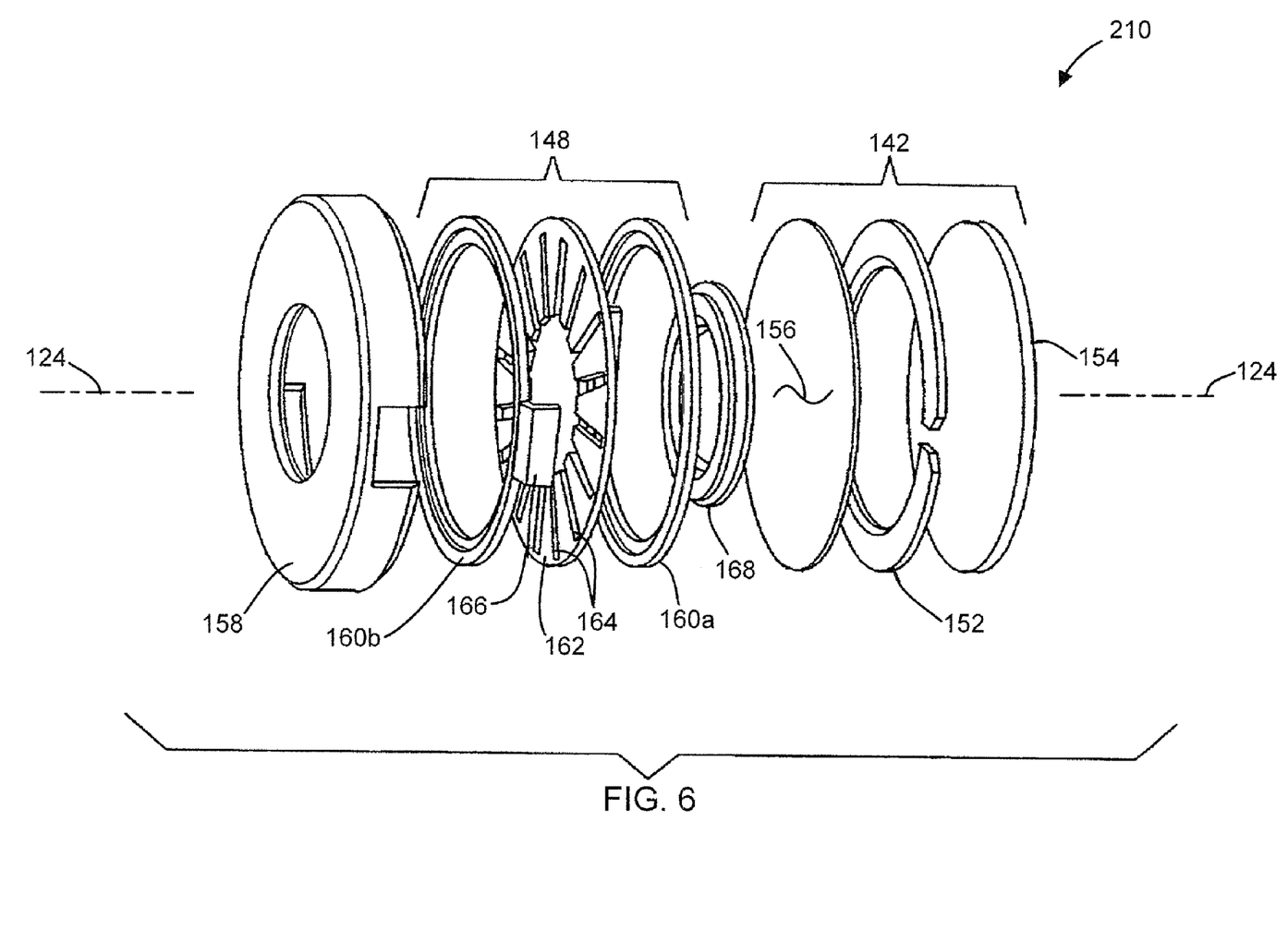
FIG. 6 is a schematic diagram showing in cross section one embodiment of a focusing apparatus shown in FIG. 3.

Referring to FIG. 6 of the drawings, one embodiment of the focusing apparatus 210 is schematically shown to include a deformable lens element 142, an actuator 148, a housing 158, and a push ring 168. The deformable lens element 142 includes a deformable surface 156, a spacer 152, and a transparent cover 154. In the illustrated example, the deformable surface 156 comprises a thin, nonporous, optically clear elastomer membrane material such as SYLGARD 184 silicon elastomer, of the type available from DOW CORNING, having an index of refraction of approximately 1.43. The cover 154 may be provided by a piece of non-deformable glass. The cover 154 may be flat as shown, or curved to provide optical power. The housing 158 encapsulates the deformable lens element 142, the actuator 148, and the push ring 168.

In another embodiment, a focusing apparatus 210 for use in scanning apparatus 100 may also be provided in accordance with focusing technologies described in U.S. patent application Ser. No. 12/432,434, entitled "FLUID LENS ELEMENT FOR USE IN CHANGING THERMAL OPERATING ENVIRONMENT" filed concurrently herewith, which is incorporated herein by reference in its entirety.

Various actuators can be utilized with the present invention. The actuator 148 illustrated in FIG. 6 is an ion conductive electro-active polymer (EAP) actuator. The actuator 148 includes a first conductor element 160a, a second conductor element 160b, and a deformable element 162 comprising a plurality of tab-like elements 164 interposed between the first conductor element 160a and second conductor element 160b. First conductor element 160a includes an electrical contact (hidden from view in FIG. 6) and second conductor element 160b also includes an electrical contact 166. Deformable element 162 can comprise one or more layers of conductive polymer material such that tab-like elements 164 bend generally in the direction of axis 124 toward the deformable lens element 142 responsive to an electrical signal being applied to conductor elements 160a and 160b. Push ring 168 applies an external force to deformable surface 156 responsive to the movement of the tab-like elements 164, thereby providing actuation for the deformable lens element 142.

The focusing apparatus 210 operates within a range bounded by two extreme states. One extreme state is a "power off" state depicted in FIG. 7 wherein tab-like elements 164 bias the push ring 168 toward the deformable surface 156. The other extreme state is a "power on" state (not shown) in which tab-like elements 164 pull push ring 168 away from the deformable surface 156 so that the deformable surface 156 is allowed to assume a generally flat and non-convex configuration. In the "power off" state, the deformable surface 156 bulges to define a convex lens surface, thereby changing an optical characteristic of focusing apparatus 210. The focusing apparatus 210 may operate in any state between the two extremes.

Figure 7:
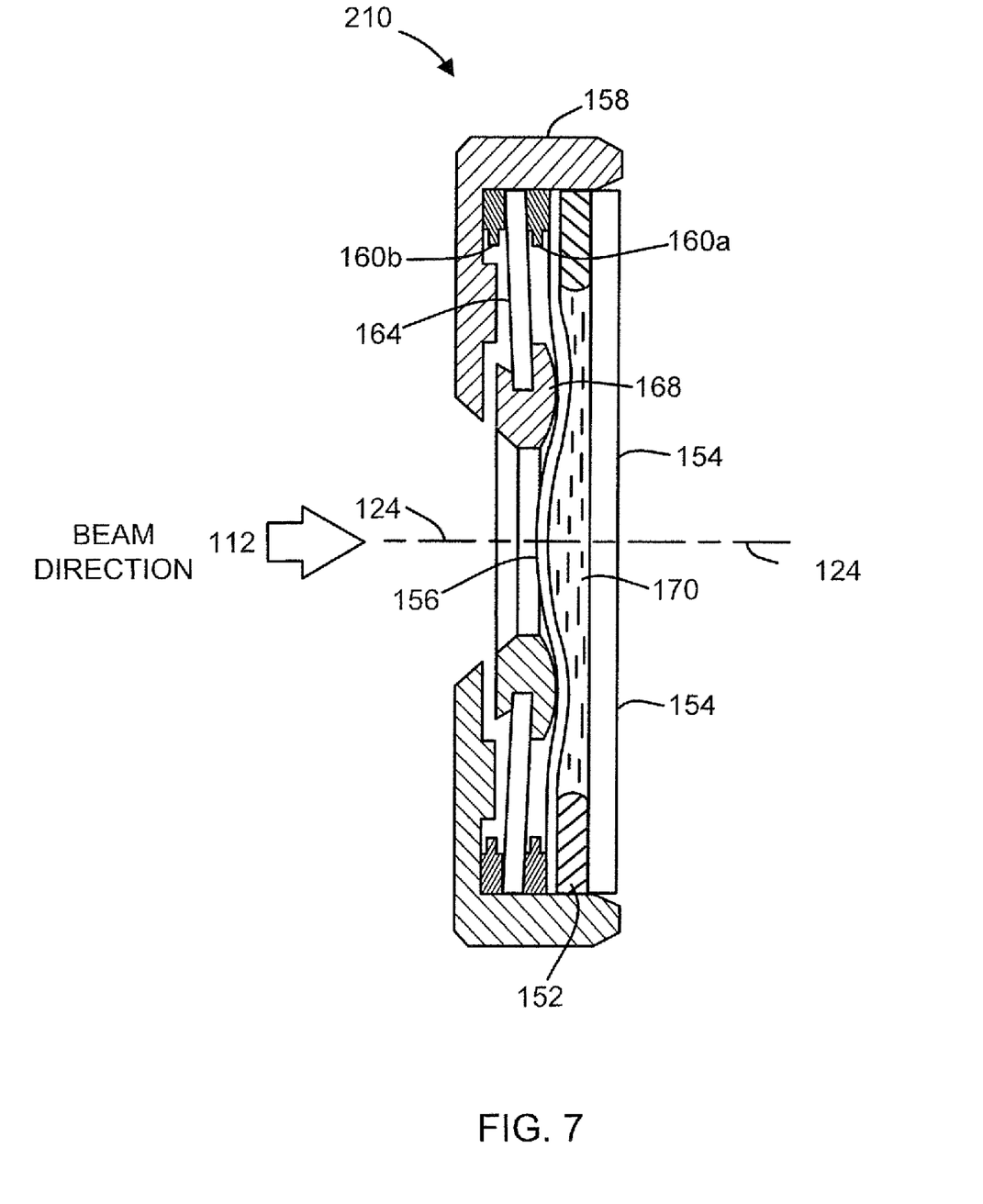
FIG. 7 is a schematic diagram showing in cross section a second embodiment of a focusing apparatus shown in FIG. 3.

In another embodiment, the tab-like elements 164 could be biased in an opposite manner to provide a convex (bulged) deformable surface 156 only when voltage is applied. At a "power off" state, the deformable surface 156 assumes a generally flat and non-convex configuration.

In yet another embodiment, a focusing apparatus 210 including the actuator for use in scanning apparatus 100 may also be provided in accordance with focusing technologies described in U.S. patent application Ser. No. 12/432,480, entitled "FOCUSING APPARATUS AND TERMINAL COMPRISING VARIABLE FOCUS LENS ASSEMBLY" filed concurrently herewith, which is incorporated herein by reference in its entirety.

Referring to FIG. 7 of the drawings, the focusing apparatus 210 is schematically shown having an ion conductive electroactive polymer actuator wherein the deformable surface 156 is in a deformed state. A cavity 170 bounded by the deformable surface 156, the spacer 152, and the cover 154 may hold an optically clear focus fluid. Selecting a focus fluid with a relatively high index of refraction will reduce the lens surface curvature change needed to obtain a given change in the distance to the plane of nominal focus. In one example, a suitable index of refraction would be in the range from about 1.4 to about 2.0. One example of a suitable focus fluid (optical fluid) is SL-5267 OPTICAL FLUID, available from SANTOLIGHT, refractive index=1.67.

In another example (not shown in the drawings), the focusing apparatus 210 comprises a resiliently deformable, optically clear substance that retains its unstressed shape. For example, a silicon gel can be provided as the deformable shape-retaining material. In this manner, the deformable surface 156 (e.g., membrane) and focus fluid disposed in cavity 170 may be replaced with the single material, silicon for example. The silicon deforms under the actuator load such that a deformable surface thereon acts as a lens, but the silicon returns to its original shape when the actuator load is removed. The resiliently deformable silicon gel can be disposed in cavity 170 (or replace cavity 170) of any of the described embodiments. For manufacture of a suitable silicon gel for use as a deformable surface 156 described herein, liquid silicon can be filled into a container of the desired shape of completed gel member and then cured. In one example, the liquid silicon can be filled into a mold in the shape of cavity 170 into which the silicon gel member will be disposed, and then cured until in silicon gel form.

Figure 8:
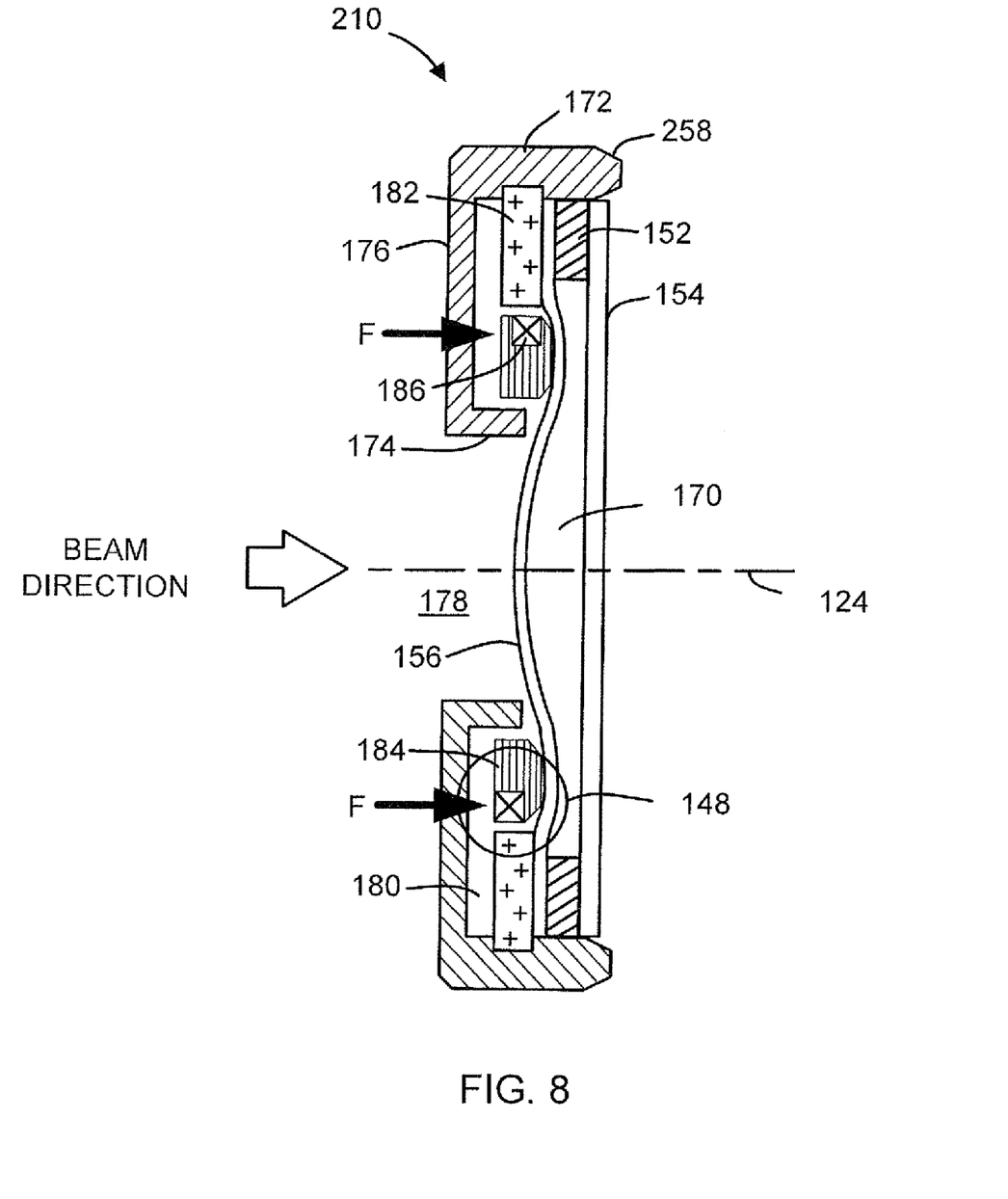
FIG. 8 is a schematic diagram showing in cross section a third embodiment of a focusing apparatus shown in FIG. 3.

Turning now to FIG. 8 of the drawings, wherein like numerals indicate like elements of FIG. 7, a preferred focusing apparatus 210 is schematically shown. In the illustrated example, the actuator 148 is a voice coil actuator. A housing 258 defines a cylindrical outer wall 172 and a cylindrical inner post 174 joined by a back plate 176. The inner post 174 is hollow, forming a center bore 178 aligned with the optical axis 124, through which the laser beam 112 passes. The housing 258 further defines an interior region 180 formed therein to capture and hold the voice coil components. Within the interior region 180, a permanent magnet 182 is secured to the inner diameter of the outer wall 172. A sleeve 184 or ring having a wire coil 186 floats within the remaining interior region 180. The deformable surface 156, spacer 152, and cover 154 are secured to the inner diameter of the outer wall 172, as previously disclosed with reference to FIG. 7. A focus fluid having an index of refraction greater than 1.0 may be disposed in the cavity 170.

In operation, an appropriate electric current is passed through the coil 186 and generates an electrical field. The electric field interacts with the magnetic field induced by the permanent magnet 182 according to the Lorentz law, imparting a driving force F at right angles to both the direction of current and magnetic flux. In the disclosed embodiment, the force F is imparted in a direction substantially parallel with the axis 124, as shown by the arrow in FIG. 8. Further, to prevent plastic deformation and wear to those portions of the deformable surface 156 that transmit the beam 112, the actuator 148 of the present invention is adapted to impart the force F at a continuum of force impartation points formed in an area pattern offset from the axis 124. The force is imparted in an area pattern offset from the axis 124 because, otherwise, repeated cycling of the deformable surface 156 by a direct force within the optical path may alter the optical characteristics of the deformable surface 156 over time, which is undesirable.

The amount of force F is directly proportional to the current passing through the coil 186. The force F causes the inner sleeve 184 to move in a direction along the axis 124 in the same direction as the propagation direction of the laser beam 112. The inner sleeve 184 presses the deformable surface 156, causing a bulging of the deformable surface 156 in a manner to create a convex lens surface. In the embodiment shown, the deformable surface 156 is configured to deform along a direction opposite to the direction of the force F. In this manner, the convex surface of the deformable surface 156 can be configured to take advantage of the difference in indices of refraction between the deformable surface 156 and an adjacently disposed substance, as will be explained in detail below. Due to the nature of voice coil design, extremely accurate movements can be achieved in very small time periods, allowing variable focus distance lens assembly 110 to be regulated with great precision.

Referring now back to FIGS. 2, 3, and 8, the controller 140 is further adapted to actuate the actuator 148 to vary a lens setting, thereby establishing a focus distance d to the target 126. In one embodiment, the controller 140 contains pre-stored instructions to vary the electrical current supplied to the voice coil actuator 148, and the instructions are transmitted along signal path 188. Upon a start event such as pulling the trigger 118, the current may be varied to the actuator 148 from a zero value to a pre-determined maximum value at pre-set time intervals. As the current varies, the focus distance of the variable focus distance lens assembly 110 continues to change until a successful decode is achieved.

In another embodiment, a focusing apparatus 210 for use in scanning apparatus 100 may also be provided in accordance with focusing and decoding technologies described in U.S. patent application Ser. No. 12/432,534, entitled "LASER SCANNER WITH IMPROVED DECODING" filed concurrently herewith, which is incorporated herein by reference in its entirety.

With reference to the construction of the scanning apparatus 100 shown in FIG. 8, the deformable surface 156 in one example is a membrane comprising SYLGARD 184 having an index of refraction of approximately 1.43. The cavity 170 may be filled with an optically clear fluid having an index of refraction that is the same or different from the membrane. In the example cited here, the index of the fluid is 1.67. However, since the deformable membrane is very thin, its effect on the optical properties of the lens system can be neglected to a first order approximation. The deformable membrane, which forms the lens, is bounded by air on one side of the lens, the air having an index of refraction of 1.0. Thus, the focus apparatus 210 defines an index of refraction difference with an index of refraction of an adjacently disposed substance. In the disclosed example, the index of refraction difference is 0.67 (1.67−1.00). This difference is significantly greater than the index of refraction difference for the electro-wetting lens assembly, which has a value of 0.1. The benefit of the greater index of refraction difference is that, in the disclosed example, the deformable surface 156 needs considerably less deformation to achieve the same change in focus distance as the electro-wetting lens assembly.

To exemplify further, reference is now made to FIG. 7 of the drawings wherein the focusing apparatus 210 includes two optical elements, namely a membrane having a deformable surface 156 and a focus fluid. The construction of the focusing apparatus 210 includes the deformable surface 156 (e.g., membrane) having an index of refraction of 1.43, and the focus fluid having an index of refraction of 1.67. Note that the air in front of the deformable surface 156 has an index of refraction of 1.00. Therefore, the focusing apparatus 210 provides an index of refraction difference of 0.43 between the deformable surface 156 and the adjacently disposed air (1.43−1.00), and an index of refraction difference of 0.24 between the focus fluid and the adjacently disposed membrane (1.67−1.43). The combination allows lens designers another possible tool with which to optimize the lenses for the particular application, such as utilizing the membrane to correct for aberrations in the beam 112 entering the variable focus distance lens assembly 110.

One advantage of the present scanning apparatus 100 is that a very small change to the deformable surface 156 of the focusing apparatus 210 will result in a significant change in the distance to the plane of nominal focus ($L_n$), that is the distance to the beam waist $W_0$ of FIG. 3. This advantage may be attributed to the fact that the deformable surface 156 is deformed only a small amount, which reduces the introduction of optical aberrations. Thus, the scanning apparatus 100 may be useful in decoding signals that are very close or quite far away from the user. In one exemplary configuration, the actuator 148 applies a small force $f_1$ to the deformable lens element 110. This small force could be a "zeroing out" force representing an initialization or calibration state, or the small force could be zero. Accordingly, the deformable surface 156 deforms slightly (or not at all) resulting in a first distance to the plane of nominal focus $L_{max}$ of approximately 40 inches (1.02 meters). Next, the actuator 148 applies a greater force $f_2$ to the deformable lens element 142 resulting in further deformation of the deformable surface 156. The resulting second distance to the plane of nominal focus $L_{min}$ is approximately 3 inches (0.076 meters), as is common in many barcode scanning applications. As can be seen, for small changes in force applied to the deformable lens element 142, a relatively large working range R can be achieved. In fact, based upon test results, a range of distances to the plane of nominal focus has been achieved that ranges from about 40 inches to about 3 inches with a single variable focus distance lens assembly 110.

Another advantage is that the focusing apparatus 210 requires a much smaller radius change than that required of a typical electro-wetting focusing apparatus to achieve the same focus distance change, thereby significantly reducing aberrations induced by a small radius of curvature.

Another advantage of the scanning apparatus 100 is that the focus fluid, if present, is fluidly isolated from the actuator 148. In a typical electro-wetting lens assembly, at least one electrode is disposed in a salt solution. In the electro-wetting focusing apparatus 10 described with reference to FIG. 1, the first electrode 24 is disposed in the second fluid 16, disclosed as a water solution laden with salts. The presence of an electrical charge in the salt-laden fluid could lead to ion transport and eventual degradation of the electrode. The structure of the present invention avoids these problems because any electrical potential, such as that utilized with the voice coil actuator of FIG. 7, is isolated from any ionic fluids.

A small sample of systems methods and apparatus that are described herein is as follows:

A1. An scanning apparatus comprising:

a laser source adapted to emit a beam along an axis and illuminate a target;

a scanning mirror disposed intermediate the laser source and the target, the scanning mirror adapted to deflect the beam emitted from the laser source so that the beam scans across the target according to a scan pattern;

a focusing apparatus comprising an actuator and a deformable lens element, said deformable lens element being in optical communication with the laser source and having a deformable surface, at least part of which transmits the beam, the actuator adapted to impart a force to the deformable surface, the force being in a first direction substantially parallel with the axis;

a detector adapted to receive light of varying intensities scattered from the target and convert the light into a signal; and a controller operatively associated with the detector for receiving the signal from the detector and decoding the signal, and further operatively associated with the focusing apparatus for actuating the actuator to vary a lens setting, the lens setting establishing a focus distance to the target;

wherein the scanning apparatus is operative to capture a first signal with the focusing apparatus set to a first focus distance, wherein the scanning apparatus is operative to capture a second signal with the focusing apparatus set to a second focus distance, wherein the scanning apparatus is further operable so that the controller utilizes each of the first signal and the second signal for attempting to decode the target.

A2. The scanning apparatus of claim A1 wherein the scanning apparatus is operative so that the focusing apparatus switches between the first focus distance and the second focus distance responsive to a command or set of commands input by an operator.

A3. The scanning apparatus of claim A1 wherein the scanning apparatus is operative so that the focusing apparatus automatically varies the focus distance between the first focus distance and the second focus distance responsive to an attempt to decode being activated by an operator.

A4. The scanning apparatus of claim A1 wherein the actuator imparts the force at a continuum of force impartation points formed in an area pattern about the axis.

A5. The scanning apparatus of claim A1 wherein the actuator is a voice coil actuator comprising a magnet and a wire coil, wherein one of the magnet and the wire coil is adapted to move in a direction parallel to the axis responsive to an electrical current being applied to the coil, thereby imparting the force to the deformable surface.

A6. The scanning apparatus of claim A1 wherein the deformable surface is configured to deform along a second direction, opposite the first direction.

A7. The scanning apparatus of claim A1 further comprising a housing adapted to secure the deformable lens element therein, the deformable lens element comprising a deformable membrane and an end plate, wherein a cavity defined by the housing, the deformable membrane, and the end plate is adapted to hold a focus fluid.

A8. The scanning apparatus of claim A7 wherein the focus fluid is fluidly isolated from the actuator.

B1. A scanning apparatus comprising:
a laser source adapted to emit a beam along an axis and illuminate a target;
a deflecting mirror disposed intermediate the laser source and the target, the deflecting mirror adapted to deflect the beam emitted from the laser source and direct the beam to the target;
a focusing apparatus comprising an actuator and a deformable lens element in optical communication with the laser source and having a deformable surface, at least part of which transmits the beam, the focusing apparatus adapted to vary a focus distance between a minimum focus distance and a maximum focus distance wherein a distance between the minimum and the maximum is greater than one foot, the actuator adapted to impart a force to the deformable surface, the force being in a first direction substantially parallel with the axis;
a detector adapted to receive light of varying intensities scattered from the target and further adapted to convert the light into a signal; and
a controller operatively associated with the focusing apparatus for actuating the actuator.

B2. The scanning apparatus of claim B1 wherein the distance between the minimum focus distance and the maximum focus distance is greater than eight feet.

B3. The scanning apparatus of claim B2 wherein the distance between the minimum focus distance and the maximum focus distance is greater than thirty feet.

B4. The scanning apparatus of claim B1 wherein the actuator imparts the force at a continuum of force impartation points formed in an area pattern about the axis.

B5. The scanning apparatus of claim B1 wherein the deformable surface is configured to deform along a second direction, opposite the first direction.

C1. A scanning apparatus comprising:
a laser source adapted to emit a beam along an axis and illuminate a target;
a scanning mirror disposed intermediate the laser source and the target, the scanning mirror adapted to deflect the beam emitted from the laser source so that the beam scans across the target according to a scan pattern;
a focusing apparatus comprising a deformable lens element in optical communication with the laser source and having a deformable surface, at least part of which transmits the beam, the deformable lens element defining an index of refraction difference with an index of refraction of an adjacently disposed substance, the index of refraction difference being greater than 0.30;
a detector adapted to receive light of varying intensities scattered from the target and convert the light into a signal; and
a controller operatively associated with the detector for receiving the signal from the detector and decoding the signal, and further operatively associated with the variable focus distance lens assembly for actuating the actuator to vary a lens setting, the lens setting establishing a focus distance to the target.

C2. The scanning apparatus of claim C1 wherein the adjacently disposed substance is air.

C3. The scanning apparatus of claim C1 wherein the index of refraction difference is greater than 0.40.

C4. The scanning apparatus of claim C1 wherein the lens element comprises a membrane and a deformable lens element.

C5. The scanning apparatus of claim C4 wherein the deformable lens element is a focus fluid.

C6. The scanning apparatus of claim C5 wherein the focus fluid has an index of refraction greater than 1.40.

C7. The scanning apparatus of claim C4 wherein the deformable lens element is a gel.

C8. The scanning apparatus of claim C4 wherein the index of refraction difference is between the membrane and the deformable lens element.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:
1. A scanning apparatus comprising:
a laser source adapted to emit a beam along an axis and illuminate a target;
a scanning mirror disposed intermediate the laser source and the target, the scanning mirror adapted to deflect the beam emitted from the laser source so that the beam scans across the target according to a scan pattern;
a focusing apparatus comprising an actuator and a deformable lens element, said deformable lens element being in optical communication with the laser source and having a deformable surface, at least part of which transmits the beam, the actuator adapted to impart a force to the deformable surface, the force being in a first direction substantially parallel with the axis;
a detector adapted to receive light of varying intensities scattered from the target and convert the light into a signal; and
a controller operatively associated with the detector for receiving the signal from the detector and decoding the signal, and further operatively associated with the focusing apparatus for actuating the actuator to vary a lens setting, the lens setting establishing a focus distance to the target;
wherein the scanning apparatus is operative to capture a first signal with the focusing apparatus set to a first focus distance;
wherein the scanning apparatus is operative to capture a second signal with the focusing apparatus set to a second focus distance;
wherein the scanning apparatus is further operable so that the controller utilizes each of the first signal and the second signal for attempting to decode the target.

2. The scanning apparatus of claim 1, wherein the scanning apparatus is operative so that the focusing apparatus switches between the first focus distance and the second focus distance responsive to a command or set of commands input by an operator.

3. The scanning apparatus of claim 1, wherein the scanning apparatus is operative so that the focusing apparatus automatically varies the focus distance between the first focus distance and the second focus distance responsive to an attempt to decode being activated by an operator.

4. The scanning apparatus of claim 1, wherein the actuator imparts the force at a continuum of force impartation points formed in an area pattern about the axis.

5. The scanning apparatus of claim 1, wherein the actuator is a voice coil actuator comprising a magnet and a wire coil, the magnet or wire coil adapted to move in a direction parallel to the axis responsive to an electrical current being applied to the wire coil, thereby imparting the force to the deformable surface.

6. The scanning apparatus of claim 1, wherein the deformable surface is configured to deform along a second direction, opposite the first direction.

7. The scanning apparatus of claim 1, further comprising a housing adapted to secure the deformable lens element therein, the deformable lens element comprising a deformable membrane and an end plate, wherein a cavity defined by the housing, the deformable membrane, and the end plate is adapted to hold a focus fluid.

8. The scanning apparatus of claim 7, wherein the focus fluid is fluidly isolated from the actuator.

9. A scanning apparatus comprising:
a laser source adapted to emit a beam along an axis and illuminate a target;
a deflecting mirror disposed intermediate the laser source and the target, the deflecting mirror adapted to deflect the beam emitted from the laser source and direct the beam to the target;
a focusing apparatus comprising an actuator and a deformable lens element in optical communication with the laser source and having a deformable surface, at least part of which transmits the beam, the focusing apparatus adapted to vary a focus distance between a minimum focus distance and a maximum focus distance wherein a distance between the minimum focus distance and the maximum focus distance is greater than one foot, the actuator adapted to impart a force to the deformable surface, the force being in a first direction substantially parallel with the axis;
a detector adapted to receive light of varying intensities scattered from the target and further adapted to convert the light into a signal; and
a controller operatively associated with the focusing apparatus for actuating the actuator.

10. The scanning apparatus of claim 9, wherein the distance between the minimum focus distance and the maximum focus distance is greater than eight feet.

11. The scanning apparatus of claim 10, wherein the distance between the minimum focus distance and the maximum focus distance is greater than thirty feet.

12. The scanning apparatus of claim 9, wherein the actuator imparts the force at a continuum of force impartation points formed in an area pattern about the axis.

13. The scanning apparatus of claim 9, wherein the deformable surface is configured to deform along a second direction, opposite the first direction.

14. A scanning apparatus comprising:
a laser source adapted to emit a beam along an axis and illuminate a target;
a scanning mirror disposed intermediate the laser source and the target, the scanning mirror adapted to deflect the beam emitted from the laser source so that the beam scans across the target according to a scan pattern;
a focusing apparatus comprising a deformable lens element in optical communication with the laser source and having a deformable surface, at least part of which transmits the beam, the deformable lens element defining an index of refraction difference with an index of refraction of an adjacently disposed substance, the index of refraction difference being greater than 0.30;
a detector adapted to receive light of varying intensities scattered from the target and convert the light into a signal; and
a controller operatively associated with the detector for receiving the signal from the detector and decoding the signal, and further operatively associated with the focusing apparatus for actuating an actuator to vary a lens setting, the lens setting establishing a focus distance to the target.

15. The scanning apparatus of claim 14, wherein the adjacently disposed substance is air.

16. The scanning apparatus of claim 14, wherein the index of refraction difference is greater than 0.40.

17. The scanning apparatus of claim 14, wherein the deformable lens element comprises a membrane.

18. The scanning apparatus of claim 17, wherein the deformable lens element is a focus fluid.

19. The scanning apparatus of claim 18, wherein the focus fluid has an index of refraction greater than 1.40.

20. The scanning apparatus of claim 17, wherein the deformable lens element is a gel.

21. The scanning apparatus of claim 17, wherein the index of refraction difference is between the index of refraction of the membrane and the index of refraction of the deformable lens element.

* * * * *